(12) United States Patent
Rozman et al.

(10) Patent No.: US 8,432,137 B2
(45) Date of Patent: Apr. 30, 2013

(54) POWER GENERATING SYSTEM WITH FLUX REGULATED GENERATOR

(75) Inventors: Gregory I. Rozman, Rockford, IL (US);
Vietson M. Nguyen, Rockford, IL (US);
Jacek F. Gieras, Glastonbury, CT (US);
Sastry V. Vedula, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 454 days.

(21) Appl. No.: 12/468,846

(22) Filed: May 19, 2009

(65) Prior Publication Data

US 2010/0295517 A1    Nov. 25, 2010

(51) Int. Cl.
*H02P 9/14* (2006.01)
*H02P 9/40* (2006.01)

(52) U.S. Cl.
USPC ............ 322/57; 322/24; 322/44; 322/46; 322/49; 322/50; 322/59; 322/89; 310/188; 310/190; 310/263

(58) Field of Classification Search ............ 322/46, 322/57, 49, 50, 52, 59; 310/190, 263; *H02P 9/14, H02P 9/40*
See application file for complete search history.

(56) References Cited

U.S. PATENT DOCUMENTS

| | | | |
|---|---|---|---|
| 3,034,035 A * | 5/1962 | Baumann et al. | 322/28 |
| 4,336,486 A * | 6/1982 | Gorden et al. | 322/63 |
| 5,218,520 A | 6/1993 | Rozman | |
| 5,493,200 A * | 2/1996 | Rozman et al. | 322/10 |
| 5,631,544 A * | 5/1997 | Syverson et al. | 322/46 |
| 5,640,314 A | 6/1997 | Glasband et al. | |
| 6,965,183 B2 | 11/2005 | Dooley | |
| 7,309,974 B2 * | 12/2007 | Sarlioglu et al. | 322/47 |
| 7,439,713 B2 | 10/2008 | Dooley | |
| 8,085,003 B2 * | 12/2011 | Gieras et al. | 322/49 |
| 2006/0097703 A1 * | 5/2006 | Suzuki et al. | 322/20 |
| 2006/0208710 A1 * | 9/2006 | Velhner et al. | 322/58 |
| 2006/0238172 A1 * | 10/2006 | Maehara et al. | 322/33 |
| 2007/0102935 A1 * | 5/2007 | Sarlioglu et al. | 290/52 |
| 2008/0079400 A1 * | 4/2008 | Lacaze | 322/20 |
| 2010/0181969 A1 * | 7/2010 | Gieras et al. | 322/59 |
| 2010/0284208 A1 * | 11/2010 | Nguyen et al. | 363/160 |
| 2010/0295517 A1 * | 11/2010 | Rozman et al. | 322/57 |

OTHER PUBLICATIONS

U.S. Appl. No. 12/435,534, filed May 5, 2009, Vietson Nguyen.
U.S. Appl. No. 12/355,864, filed Jan. 19, 2009, Jacek F. Gieras.

* cited by examiner

*Primary Examiner* — John K Kim
(74) *Attorney, Agent, or Firm* — Stephen G. Mican (57) ABSTRACT

A method for generating and controlling power by means of at least one controlled permanent magnet machine (PMM) with a permanent magnet (PM) rotor and a stator with a magnetic flux diverter circuit for controlling the output of the PMM, comprises the steps of: rotating the PM rotor at a velocity sufficient to develop a high frequency alternating current (HFAC) power output from the stator; transforming the HFAC output to produce a desired non-HFAC power output; sensing desired power output parameters; generating a control signal responsive to the sensed parameters; and applying the control signal to the magnetic flux diverter circuit to control the desired power output.

19 Claims, 5 Drawing Sheets

POWER GENERATING SYSTEM WITH FLUX REGULATED GENERATOR

FIELD OF THE INVENTION

The invention relates to electric power generation systems, and more particularly to prime mover driven electric power generation systems with power regulation by means of magnetic flux control.

BACKGROUND OF THE INVENTION

It is of great importance to minimize the size and weight of electric power generation and regulation systems for mobile applications. Such power generation and regulation systems generally derive electrical power for their operation from a mechanical source that comprises a prime mover, such as an engine. An electrical generator converts mechanical power from the prime mover into electrical power. Regulation of such systems has generally involved the use of a wound field synchronous machine (WFSM) with exciter control or a permanent magnet machine (PMM) with high power electronic regulation of a direct current (DC) output or DC link. Both of these options involve increased cost and weight.

SUMMARY OF THE INVENTION

The invention generally comprises a method for generating and regulating power by means of at least one controlled permanent magnet machine (PMM) with a permanent magnet (PM) rotor and a stator with a magnetic flux diverter circuit for controlling the output of the PMM, comprising the steps of: rotating the PM rotor at a velocity sufficient to develop a high frequency alternating current (HFAC) power output from the stator; transforming the HFAC output to produce a desired non-HFAC power output; sensing desired power output parameters; generating a control signal responsive to the sensed parameters; and applying the control signal to the magnetic flux diverter circuit to control the desired power output.

DETAILED DESCRIPTION OF THE INVENTION

Figure 1:
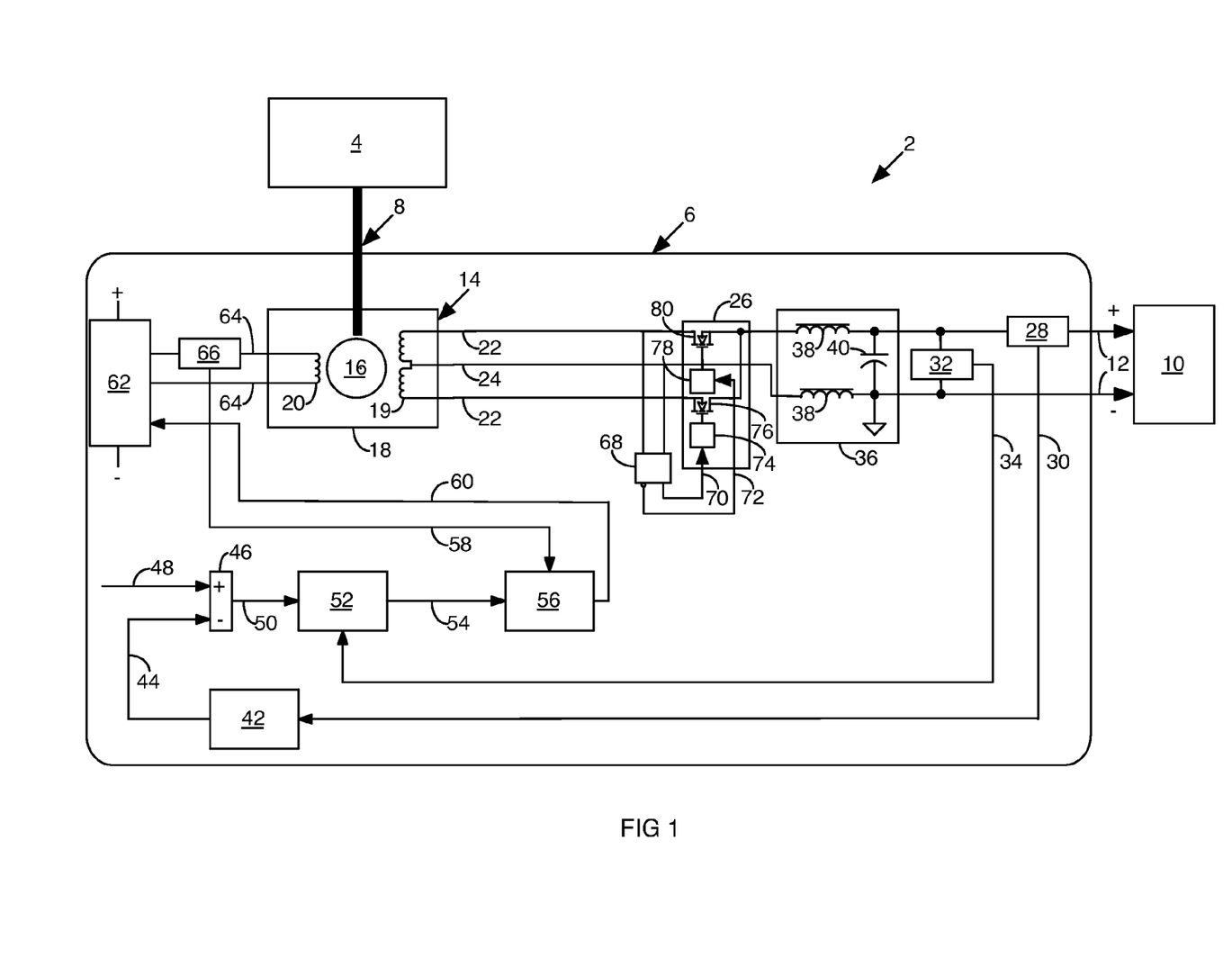
FIG. 1 is a schematic diagram of a power generation and regulation system according to a first embodiment of the invention.

FIG. 1 is a schematic diagram of a power generation and regulation system 2 according to a first embodiment of the invention. The power system 2 comprises a prime mover 4, such as a gas turbine engine, that couples to at least one high frequency alternating current (HFAC) generator module 6 by means of a prime mover drive shaft 8. The HFAC generator module 6 includes a desired direct current (DC) power output that an electrical load 10 receives by way of generator module output lines 12.

The generator module 6 comprises a single phase controlled permanent magnet machine (PMM) 14 that serves as a HFAC generator, such as of the type described in U.S. Pat. No. 8,085,003 to Gieras et al., owned by the assignee of this application and hereby incorporated by reference. Each PMM 14 has a permanent magnet (PM) rotor 16 and a stator 18 with a winding 19 and a magnetic flux diverter circuit 20. The prime mover 4 rotates the PM rotor 16 by way of the prime mover drive shaft 8 at a velocity sufficient to develop a HFAC current in the stator 18. The winding 19 of the stator 18 has a centre-tapped single phase output with a centre tap to provide a balanced single phase HFAC output on stator output lines 22 with respect to the centre tap on stator neutral line 24.

A power transformation circuit 26, shown as a synchronous rectification circuit in FIG. 1, receives the balanced single phase HFAC output on the stator output lines 22 and transforms it to produce the desired DC output of the generator module 6 on its respective generator module output line 12. A current sensor 28 may monitor the current level of the desired DC power output on the generator module output lines 12 and generate a respective current feedback signal on a current feedback line 30 that is representative of the sensed current level. An electrical potential difference sensor 32 may monitor the level of potential difference between the generator output lines 12 and generate a respective electrical potential difference feedback signal on a potential difference feedback line 34 that is representative of the sensed potential difference level. A low-pass filter network 36 coupled to the output of the power transformation circuit 26, comprising output filter inductors 38 and output filter capacitor 40, filters any HFAC content from the generator module output lines 12.

A current limit look-up table circuit 42 receives the current feedback signal on the current feedback line 30 and generates an electrical potential difference offset signal on a look-up table output line 44 that is representative of a value of potential difference needed to limit current to a desired level. A summer 46 receives a desired electrical potential difference reference signal on a DC electrical potential reference level line 48 and the electrical potential difference offset signal on the look-up table output line 44 to generate a compensated electrical potential difference reference signal on a summer output line 50 that is representative of the difference.

An electrical potential difference regulator circuit 52 receives the compensated electrical potential difference reference signal on the summer output line 50 and the electrical potential difference feedback signal on the potential difference feedback line 34 and generates on a control current reference signal line 54 a control current reference signal that is responsive to the difference. A control current regulator circuit 56 receives the control current reference signal on the control current reference line 54 and a control current feedback signal on a control current feedback line 58 and generates on a magnetic flux diverter circuit current drive line 60 a magnetic flux diverter circuit current drive signal that is responsive to the difference.

An H-bridge 62 receives the magnetic flux diverter circuit current drive signal on the magnetic flux diverter circuit current drive line 60 to produce a magnetic flux diverter circuit current on H-bridge output lines 64. The magnetic flux diverter circuit 20 receives the magnetic flux diverter circuit current on the H-bridge output lines 60 to control the level of the balanced single phase HFAC output on the stator output lines 22. A magnetic flux diverter circuit current sensor 66 senses the level of magnetic flux diverter current passing through the H-bridge output lines 64 and generates the control current feedback signal on the control current feedback line 58 to be representative of the sensed current level.

A zero crossing detector circuit 68 senses the zero crossings of the HFAC output signal on one of the stator output lines 22 relative to the stator neutral line 24 and generates a zero crossing output signal on a zero crossing output signal line 70 and an inverted zero crossing output signal on an inverted zero crossing output line 72. A first synchronous rectifier drive circuit 74 in the power transformation circuit 26 receives the zero crossing output signal by way of the zero crossing output line 70 and generates a respective first gate drive signal to drive a respective first synchronous rectifier 76 and control current flow between one of the stator output lines 22 and one of the generator module output lines 12. A second synchronous rectifier gate drive circuit 78 receives the inverted zero crossing output signal by way of the inverted zero crossing output signal line 72 and generates a respective second gate drive signal to drive a respective second synchronous rectifier 80 and control current flow between the other one of the stator output lines 22 and the generator module output line 12.

Figure 2:
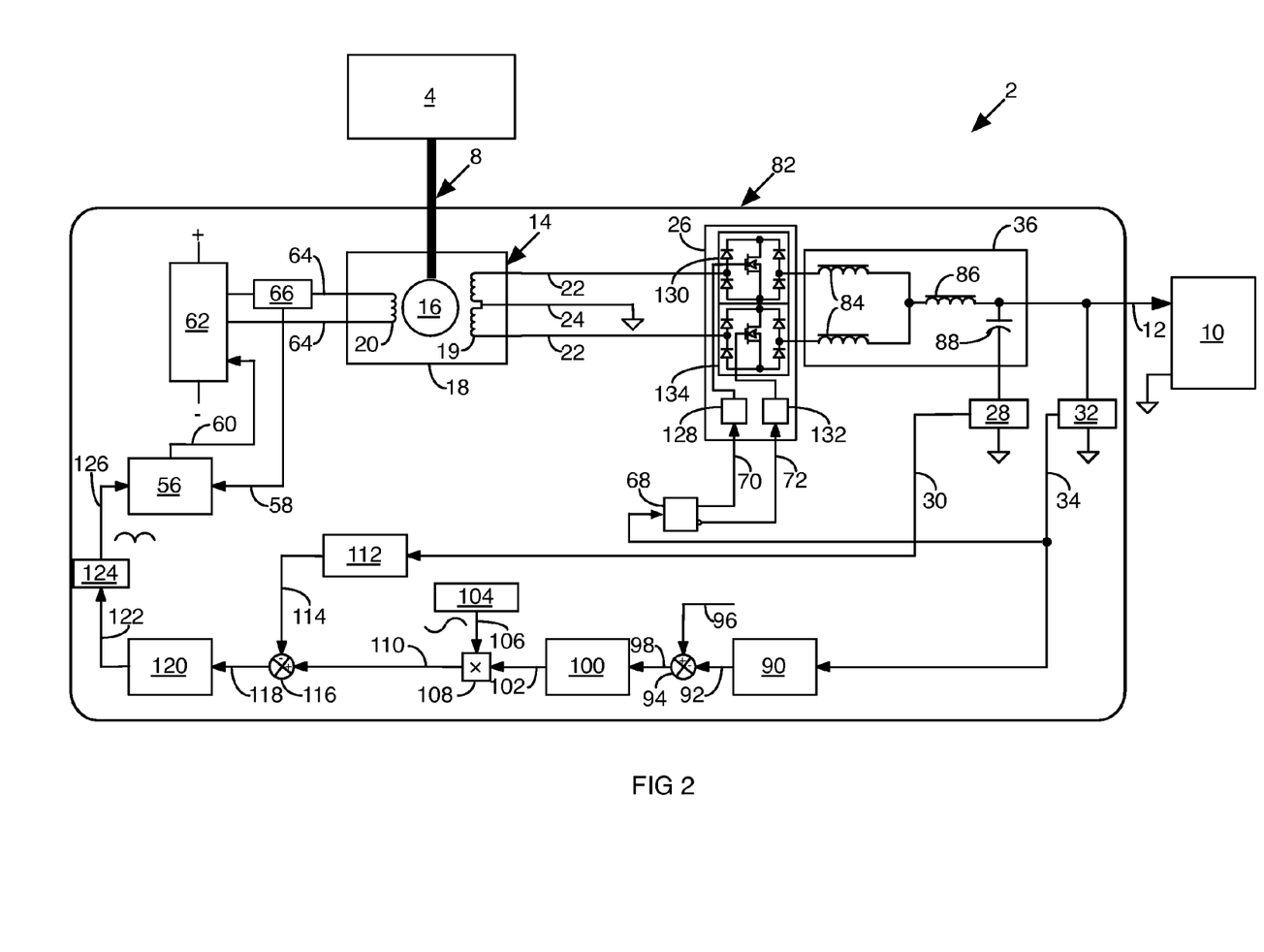
FIG. 2 is a schematic diagram of a power generation and regulation system according to a second possible embodiment of the invention.

FIG. 2 is a schematic diagram of the power generation and regulation system 2 according to a second possible embodiment of the invention. Similar to the first embodiment, the motor drive system 2 comprises a prime mover 4, but it couples to a generator module 82 by way of the prime mover drive shaft 8. However, the generator module 82 generates a desired low frequency AC power on the generator module output line 12.

The generator module 82 comprises the PMM 14 as described in connection with the generator module 6. It has the same PM rotor 16 and the stator 18 with the magnetic flux diverter circuit 20. Likewise, the prime mover 4 rotates the PM rotor 16 by way of the prime mover drive shaft 8 at a velocity sufficient to develop a HFAC current in the stator 18. The stator 18 again has a centre-tapped single phase output with the centre tap grounded to provide a balanced single phase HFAC output with respect to the centre tap on stator neutral line 24.

The power transformation circuit 26, shown as a bi-directional switching circuit in FIG. 2, receives the balanced single phase HFAC output on the stator output lines 22 and transforms it to produce the desired single phase low frequency AC output of the generator module 82 on it generator module output line 12. The module also includes the low-pass filter network 36 coupled to the output of the power transformation circuit 26, shown in FIG. 2 as two commutating inductors 84 to limit bi-directional current within the power transformation circuit 26 during commutation, an output filter inductor 86 and an output filter capacitor 88. The current sensor 28 may monitor current that passes through the output capacitor 88 from the generator module output line 12 to system ground and generate an output capacitor current feedback signal on the current feedback line 30. The electrical potential difference sensor 32 may monitor the level of potential difference between the generator output line 12 and system ground and generate a respective electrical potential difference feedback signal on the potential difference feedback line 34 that is representative of the sensed potential difference level.

A root-mean-square (RMS) calculation circuit 90 receives the electrical potential difference feedback signal on the potential difference feedback line 34 and generates a respective RMS potential difference signal on a measured RMS output line 92. A summer 94 receives the RMS potential difference signal on the measured RMS output line 92 and a RMS reference level electrical potential difference signal on a RMS reference potential difference line 96 that represents the desired level of electrical potential difference for the low frequency AC power output on the generator module output line 12 and generates an electrical potential difference error signal on a summer output line 98 that is representative of the difference.

An RMS proportional-plus-integral (PI) controller 100 receives the error signal on the summer output line 98 and generates a corresponding PI controller output signal on an RMS controller output line 102.

A sine wave generator circuit 104 generates an AC reference signal on a reference frequency line 106 with a frequency corresponding to the desired frequency of the low frequency AC output power on the generator module output line 12. A multiplier 108 receives the PI controller output signal on the PI controller output line 102 and the AC reference signal on a reference frequency line 106 and generates an output filter capacitor current reference signal on a multiplier output line 110.

A low pass filter 112 receives the output filter capacitor 88 current feedback signal on the current feedback line 30 and passes low frequency content of the output capacitor 88 current feedback signal as a filtered capacitor current feedback signal on a low pass filter output line 114. A summer 116 receives the output filter capacitor current reference signal on the multiplier output line 110 and the filtered capacitor current feedback signal on the low pass filter output line 114 to generate an error signal on a summer output line 118.

An RMS output filter capacitor current regulator 120 receives the error signal on the summer output line 118 and generates a corresponding control current reference signal on control current reference line 122. An absolute value output circuit 124 receives the control current reference signal on the control current reference line 122 and converts it to an absolute value signal on an absolute value line 126.

The control current regulator circuit 56 receives the absolute value signal on the absolute value line 126 and a control current feedback signal on the control current feedback line 58 and generates on the magnetic flux diverter circuit current drive line 60 a magnetic flux diverter circuit current drive signal that is representative of the difference.

The H-bridge 62 receives the magnetic flux diverter circuit current drive signal on the magnetic flux diverter circuit current drive line 60 to produce a magnetic flux diverter circuit current on H-bridge output lines 64. The magnetic flux diverter circuit 20 receives the magnetic flux diverter circuit current on the H-bridge output lines 60 to control the level of the balanced single phase HFAC output on the stator output lines 22. The magnetic flux diverter circuit current sensor 66 senses the level of magnetic flux diverter current passing through the H-bridge output lines 64 and generates the control current feedback signal on the control current feedback line 58 to be representative of the sensed current level.

The zero crossing detector circuit 68 senses the zero crossings of the desired low frequency AC power output on the generator module output line 12 by way of the electrical potential difference feedback signal on the potential difference feedback line 34 and generates a zero crossing output signal on the zero crossing output signal line 70 and an inverted zero crossing output signal on the inverted zero crossing output line 72.

A first bi-directional gate drive circuit 128 in the power transformation circuit 26 receives the zero crossing output signal by way of the zero crossing output line 70 and generates a respective first gate drive signal to drive a respective first bi-directional switch 130 and control current flow through a respective one of the stator output lines 22 to the generator module output line 12. A second bi-directional gate drive circuit 132 receives the inverted zero crossing output signal by way of the inverted zero crossing output signal line 72 and generates a respective second gate drive signal to drive a respective second bi-directional switch 134 and control current flow between the other one of the stator output lines 22 and the generator module output line 12.

Since the control current reference signal on the control current reference line 122 is a rectified fundamental frequency that represents the desired frequency of the variable low frequency AC output of its respective generator module 82 on its respective generator module output line 12, the action of the generator module 82 is that of an electromechanical amplifier, wherein the control current reference signal on the control current reference line 122 may be of low power to control the high power of the desired low frequency output on the generator module output line 12. Another way of looking at the action is that the relatively low power control current reference signal on the control current reference line 122 by means of the magnetic flux diverter circuit 20 modulates the HFAC output on the stator output lines 22 and the power transformation circuit 26 demodulates the HFAC output on the stator output lines 22 to produce the high power low frequency AC output on the generator module output line 12 with the same frequency as its respective control current reference signal on the control current reference line 122.

Since the output filter capacitor 88 current reference signal on the summer output line 118 is responsive to the output capacitor current feedback signal on the current feedback line 30, the generator module 82 also maintains a sinusoidal current at the frequency of the desired low frequency AC power output on the generator module output line 12 by modulating the control current reference signal on the control current reference line 122. This feature enables a good waveform for the desired low frequency AC power output on the generator module output line 12 even when the electrical load 10 is non-linear.

Figure 3:
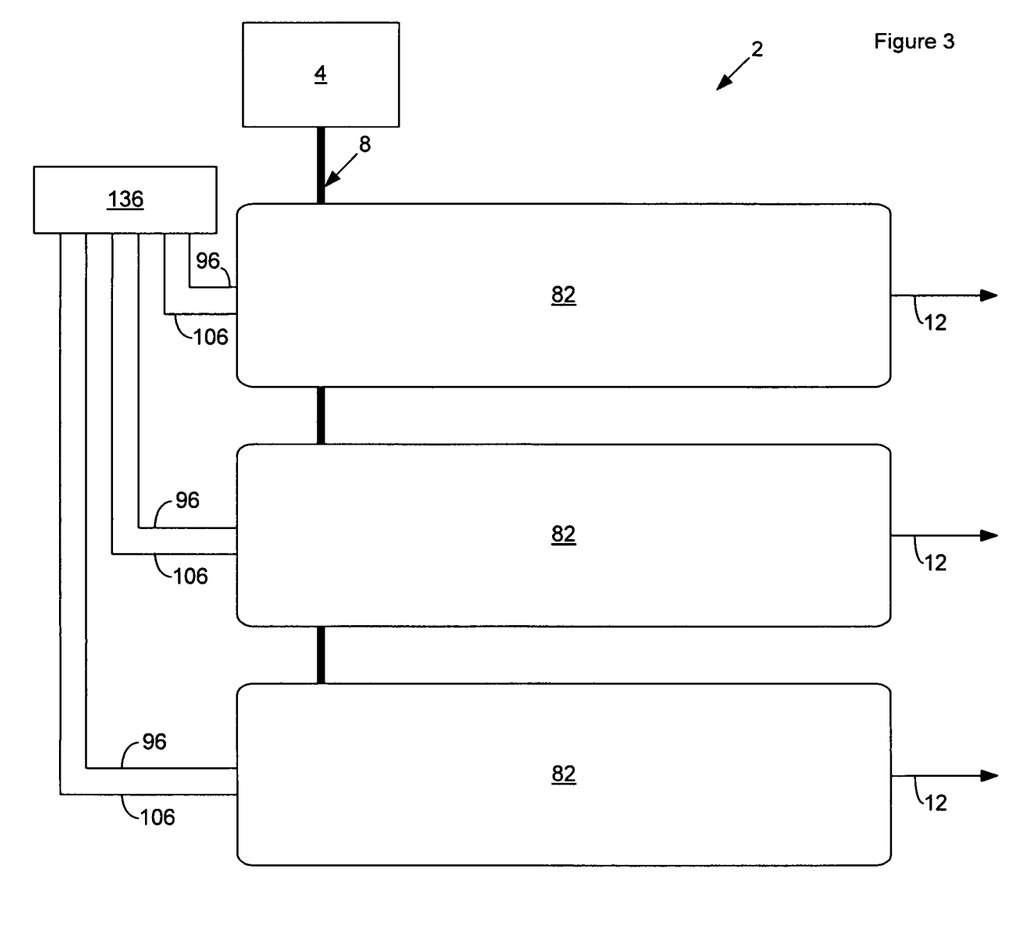
FIG. 3 is a schematic diagram of a power generation and regulation system according to a third possible embodiment of the invention.

FIG. 3 is a schematic diagram of the power generation and regulation system 2 according to a third possible embodiment of the invention. For this embodiment, the power system has N of the generator modules 82 coupled to the prime mover 4 by the prime mover drive shaft 8 to generate N phases of output, with the power output of each generator module output line 12 shifted by 360/N degrees relative to its neighbouring generator module. By way of illustration only, FIG. 3 shows a power system 2 with three phases using three of the generator modules 82, with three generator module output lines 12 having outputs shifted 120 degrees relative to each other.

For each generator module 82 a system controller 136 generates a reference level electrical potential difference signal on a corresponding reference potential difference line 96 and an AC reference signal on a corresponding reference frequency line 106 with a frequency corresponding to the desired frequency of the low frequency AC output power. The AC reference signals will be shifted by 360/N degrees relative to each other, or 120 degrees for a three phase power system 2 as shown in FIG. 3.

Figure 4:
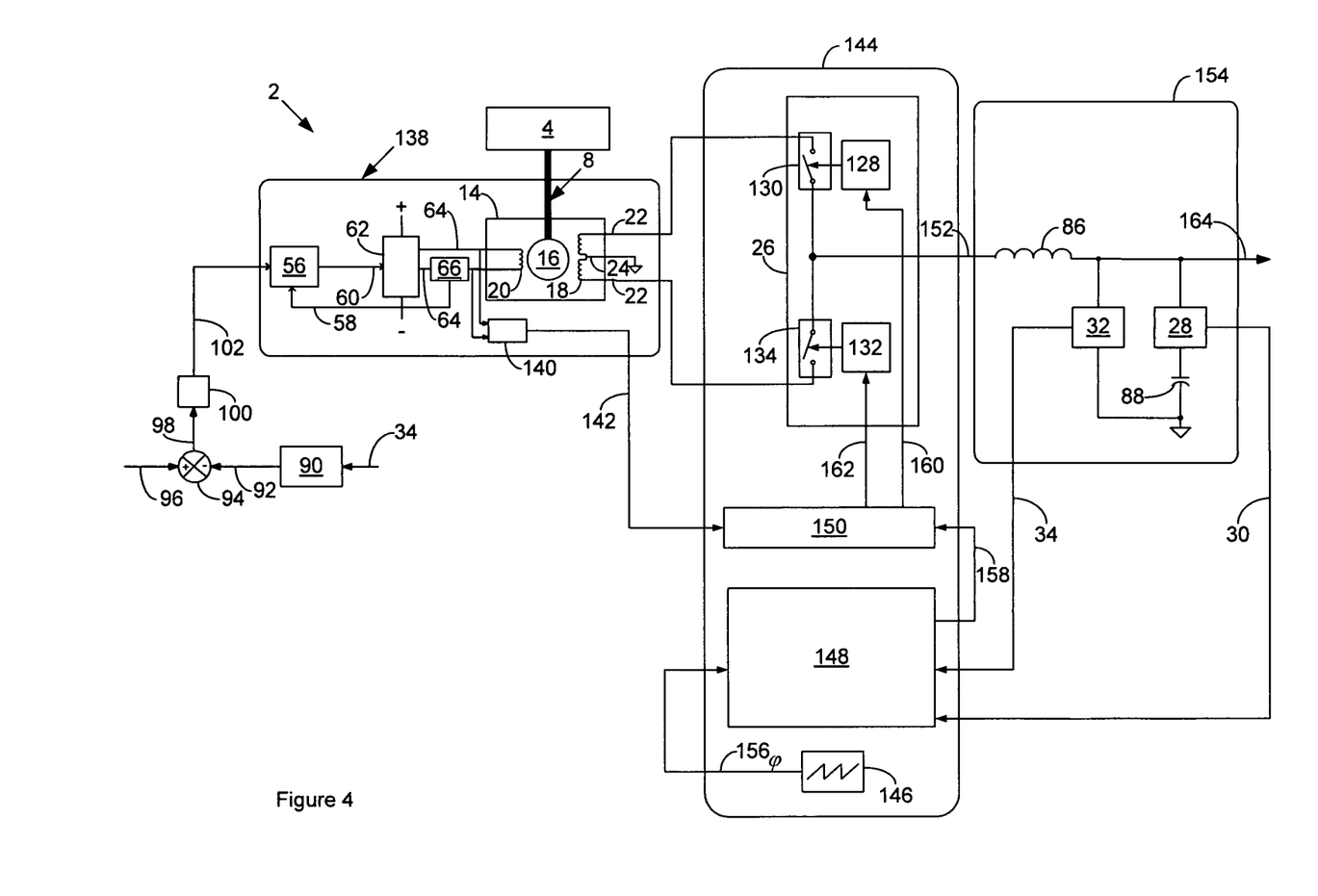
FIG. 4 is a schematic diagram of a power generation and regulation system according to a fourth possible embodiment of the invention.

FIG. 4 is a schematic diagram of the power generation and regulation system 2 according to a fourth possible embodiment of the invention. The power system 2 for this embodiment is a single phase AC system that uses a sliding mode cycloconverter system as described in co-pending patent application U.S. Ser. No. 12/435,534 to Nguyen et al., owned by the assignee and hereby incorporated by reference. The power system 2 has a generator module 138 that is similar to the generator module 82, except that its output comprises the balanced single phase HFAC output on the stator output lines 22 and it also comprises an electrical potential difference sensor 140 that senses the level of electrical potential difference across the magnetic flux diverter circuit 20 and generates a magnetic flux diverter circuit potential difference signal on a magnetic flux diverter circuit potential difference line 142 that is representative of the sensed level.

A single phase sliding mode cycloconverter 144 comprises the power transformation circuit 26, shown as a bi-directional switching circuit in FIG. 4 with the first bi-directional gate drive circuit 128, the first bi-directional switch 130, the second bi-directional gate drive circuit 132 and the second bi-directional switch 134, as described for the second embodiment of the invention in connection with FIG. 2. It also comprises an angle generator 146, a sliding mode converter 148 and a signal steering block 150, as described in Nguyen et al. The power transformation circuit 26 receives the HFAC output on the stator output lines 22 and transforms it to a desired low frequency AC power output on a cycloconverter output line 152.

A low pass filter network 154, similar to the low pass filter network 36 described for the second embodiment of the invention in connection with FIG. 2, comprising the output filter inductor 86, the output filter capacitor 88, the current sensor 28 and the electrical potential difference sensor 32.

The angle generator 146 generates an angle reference frequency signal φ on an angle reference frequency line 156 that has a frequency corresponding to the frequency of the desired low frequency AC power output on the cycloconverter output line 152. The signal steering block 148 receives the angle signal φ on the angle line 156, the output capacitor current feedback signal on the current feedback line 30 and the electrical potential difference feedback signal on the potential difference feedback line 34 and generates a respective control signal on a sliding mode controller output line 158.

The signal steering block 150 receives the control signal on the sliding mode controller output line 158 and the magnetic flux diverter circuit potential difference signal on the magnetic flux diverter circuit potential difference line 142 and generates gate drive signals for the first bi-directional gate drive circuit 128 and second bi-directional gate drive circuit 132 on respective steering block first and second drive lines 160 and 162, thereby controlling the first bi-directional switch 130 and the second bi-directional switch 134 in the power transformation circuit 26.

The root-mean-square (RMS) calculation circuit 90 receives the electrical potential difference feedback signal on the potential difference feedback line 34 and generates a respective RMS electrical potential difference signal on the measured RMS output line 92. The summer 94 receives the RMS electrical potential difference signal on the measured RMS output line 92 and a RMS electrical potential difference reference signal on a RMS electrical potential difference reference signal line 96 to generate an error signal on a summer output line 98.

The proportional-plus-integral (PI) controller 100 receives the error signal on the summer output line 98 and generates a corresponding controller output signal on the controller output line 102. The control current regulator circuit 56 receives the controller output signal on the controller output line 102 and a control current feedback signal on the control current feedback line 58 and generates a magnetic flux diverter circuit current drive signal on the magnetic flux diverter circuit current drive line 60 that is representative of the difference.

The H-bridge 62 receives the magnetic flux diverter circuit current drive signal on the magnetic flux diverter circuit current drive line 60 to produce a magnetic flux diverter circuit current on H-bridge output lines 64. The magnetic flux diverter circuit 20 receives the magnetic flux diverter circuit current on the H-bridge output lines 60 to control the level of the balanced single phase HFAC output on the stator output lines 22. The magnetic flux diverter circuit current sensor 66 senses the level of magnetic flux diverter current passing through the H-bridge output lines 64 and generates the control current feedback signal on the control current feedback line 58 to be representative of the sensed current level.

The low pass filter network 154 filters HFAC content from the desired low frequency AC power output on the cycloconverter output line 152 to pass a filtered AC power output on a power output line 164. Similar to the second embodiment of the power system 2 as described in connection with FIG. 2, the power system 2 according to this embodiment employs the output capacitor current feedback signal on the current feedback line 30 to adjust the output waveform of the filtered AC power output on the power output line 164 in response to non-linear loads.

Figure 5:
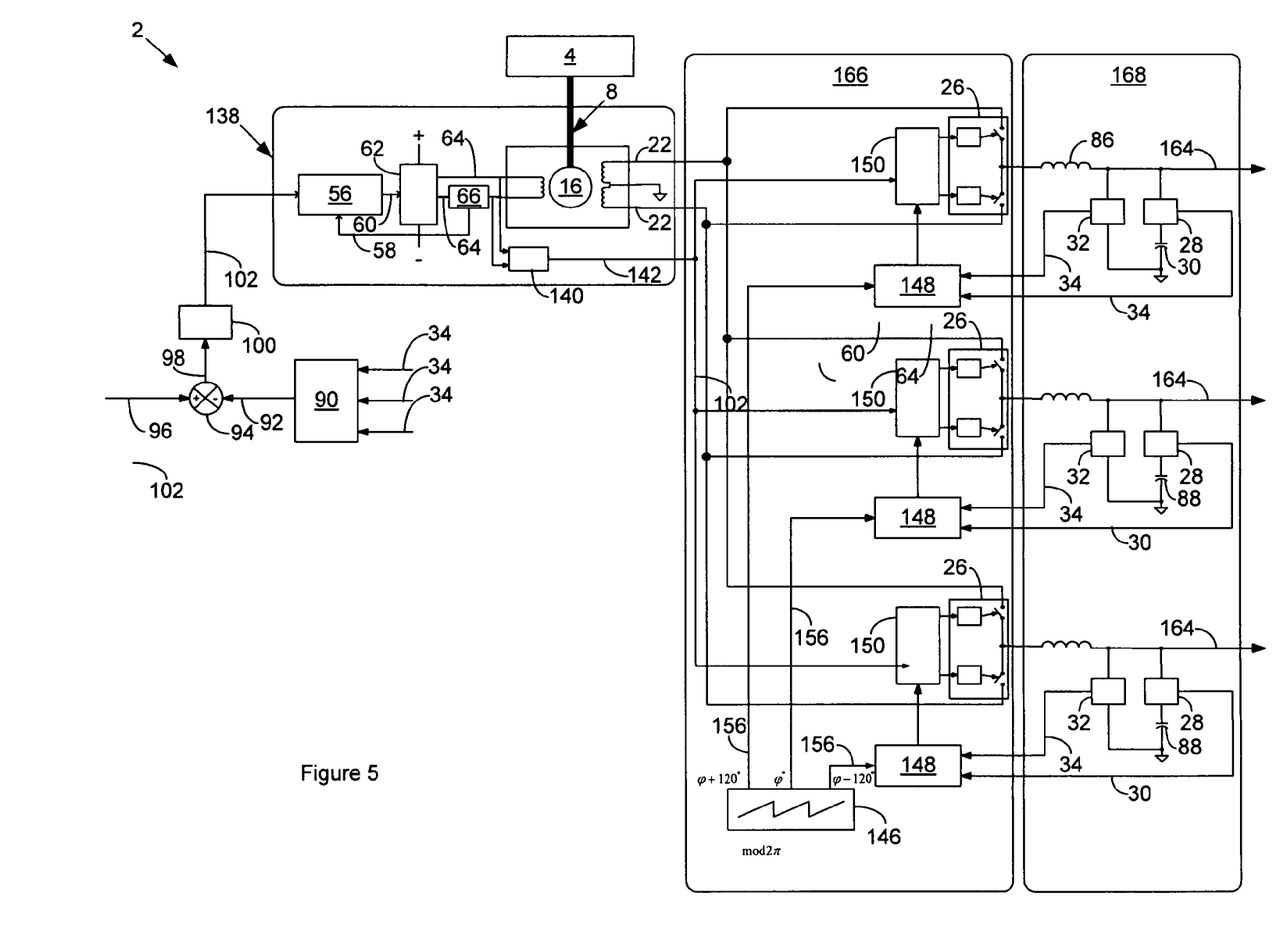
FIG. 5 is a schematic diagram of a power generation and regulation system according to a fifth possible embodiment of the invention.

FIG. 5 is a schematic diagram of the power generation and regulation system 2 according to a fifth possible embodiment of the invention. It is similar to the single phase power system 2 described in connection with FIG. 4, except it employs a multiphase cycloconverter 166 and a multiphase low pass filter network 168. The multiphase cycloconverter 166 essentially comprises N of the single phase cycloconverters 144, where N is the number of phases, except that the angle generator may generate N angle signals, one for each of the N phases, each of the angle signals shifted by 360/N degrees. By way of example only, FIG. 5 shows the power system 2 with three phases. In this case, the angle generator 146 generates three angle signals, one for each phase, and the root-mean-square (RMS) calculation circuit 90 receives the electrical potential difference feedback signal on the potential difference feedback line 34 for each phase of the power system 2.

The described embodiments of the invention are only some illustrative implementations of the invention wherein changes and substitutions of the various parts and arrangement thereof are within the scope of the invention as set forth in the attached claims.

The invention claimed is:

1. A method for generating and regulating power by means of at least one controlled permanent magnet machine (PMM) with a permanent magnet (PM) rotor and a stator with a magnetic circuit that diverts flux within the stator for controlling the output of the PMM, comprising the steps of:
rotating the PM rotor at a velocity sufficient to develop an alternating current (AC) power output from the stator;
transforming the AC output from the stator to produce a desired power output that has a frequency less than the AC power output from the stator;
sensing desired power output parameters;
generating a control signal responsive to the sensed parameters; and
applying the control signal to the magnetic circuit that diverts flux within the stator to control the desired power output.

2. The method of claim 1, wherein the step of transforming comprises transformation by means of synchronous rectification.

3. The method of claim 1, wherein the step of transforming comprises transformation by means of bi-directional switching.

4. The method of claim 1, wherein the step of transforming transformation comprises transformation by means of cyclo-conversion.

5. The method of claim 1, wherein the sensed power output parameters comprise electrical potential difference and current.

6. The method of claim 1, wherein the desired power output is direct current (DC).

7. The method of claim 1, wherein the desired power output is AC that is lower in frequency than the AC power output from the stator.

8. The method of claim 7, wherein the control signal includes a reference AC component that is lower in frequency than the AC power output from the stator.

9. The method of claim 8, wherein N number of PMMs produce N phases of desired AC power output.

10. The method of claim 4, wherein one PMM produces one phase of AC power output from its stator and the cyclo-conversion produces N phases of desired AC power output.

11. A method for generating and regulating direct current (DC) power by means of a single-phase permanent magnet machine (PMM) with a permanent magnet (PM) rotor and a stator with a magnetic circuit that diverts flux within the stator for controlling the output of the PMM, comprising the steps of:
rotating the PM rotor of the PMM at a velocity sufficient to develop an alternating current (AC) power output from the stator of each PMM;
transforming the AC output from the stator of each PMM to produce a desired DC power output;
sensing desired power output parameters of the desired power output;
generating a control signal for the PMM responsive to the sensed parameters for the desired DC power output; and
applying the control signal to the magnetic circuit that diverts flux within the stator to control the desired DC power output.

12. The method of claim 11, wherein the step of transforming comprises transformation by means of synchronous rectification.

13. The method of claim 11, wherein the sensed power output parameters comprise electrical potential difference and current.

14. A method for generating and regulating alternating current (AC) power with N phases by means of N controlled single-phase permanent magnet machines (PMMs), each with a permanent magnet (PM) rotor and a stator with a magnetic circuit that diverts flux within the stator for controlling the output of the PMM, comprising the steps of:
rotating the PM rotor of each PMM at a velocity sufficient to develop an alternating current (AC) power output from the stator of each PMM;
transforming the AC output from the stator of each PMM to produce a desired AC power output with N phases that has a frequency less than the AC power output from the stator of each PMM;
sensing desired power output parameters for each respective phase of the desired power output;
generating a respective AC control signal that is lower in frequency than the AC power output from the stator for each PMM responsive to the sensed parameters for a respective phase of the desired AC power output; and
applying each control signal to the magnetic circuit that diverts flux within the stator for each respective PMM to control the desired power output.

15. The method of claim 14, wherein the step of transforming comprises transformation by means of bi-directional switching.

16. The method of claim 14, wherein the sensed power output parameters comprise electrical potential difference and current.

17. A method for generating and regulating alternating current (AC) power with N phases by means of one controlled permanent magnet machine (PMM) with a permanent magnet (PM) rotor and a stator with a magnetic circuit that diverts flux within the stator for controlling the output of the PMM, comprising the steps of:
- rotating the PM rotor at a velocity sufficient to develop an alternating current (AC) power output from the stator;
- transforming the AC output to produce a desired AC power output with N phases that has a frequency less than the AC power output from the stator of each PMM;
- sensing desired power output parameters for each respective phase of the desired power output;
- generating a control signal responsive to the sensed parameters; and
- applying the control signal to the magnetic flux diverter circuit within the stator of the PMM to control the desired power output.

18. The method of claim 17, wherein the step of transforming comprises transformation by means of cycloconversion.

19. The method of claim 17, wherein the sensed power output parameters comprise electrical potential difference and current.

\* \* \* \* \*